US007042674B1

(12) United States Patent
Baril et al.

(10) Patent No.: US 7,042,674 B1
(45) Date of Patent: May 9, 2006

(54) DISK DRIVE HEAD RESETTING SYSTEM USING SLIDER HEATER

(75) Inventors: Lydia Baril, Bouc Bel Air (FR); Brian Strom, Cupertino, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/050,462

(22) Filed: Feb. 3, 2005

Related U.S. Application Data

(60) Provisional application No. 60/542,645, filed on Feb. 5, 2004.

(51) Int. Cl.
*G11B 21/02* (2006.01)

(52) U.S. Cl. .......................................................... 360/75

(58) Field of Classification Search ..................... None
See application file for complete search history.

(56) References Cited

U.S. PATENT DOCUMENTS

| | | | | |
|---|---|---|---|---|
| 5,969,523 | A | 10/1999 | Chung et al. | 324/252 |
| 6,118,622 | A | 9/2000 | Gill | 360/66 |
| 6,275,028 | B1 | 8/2001 | Matsui et al. | 324/210 |
| 6,324,029 | B1 | 11/2001 | Matsubara et al. | 360/75 |
| 6,366,420 | B1 | 4/2002 | Ranmuthu et al. | 360/66 |
| 2003/0099054 | A1* | 5/2003 | Kamijima | 360/59 |
| 2005/0105204 | A1* | 5/2005 | Bloodworth et al. | 360/75 |

OTHER PUBLICATIONS

U.S. Appl. No. 10/859,917, filed Jun. 3, 2004, Yan et al.

* cited by examiner

*Primary Examiner*—David Hudspeth
*Assistant Examiner*—Mitchell Slavitt
(74) *Attorney, Agent, or Firm*—Marsh Fischmann & Breyfogle LLP

(57) ABSTRACT

The invention is generally directed to a disk drive head resetting system. The system has a slider with a disk drive head associated therewith. The disk drive head may be on the slider and affixed thereto. A heater is also associated with a slider and spaced apart from the disk drive head. A controller is communicatively coupled to the heater and to the head to transfer a first control signal to the heater and a second control signal to the disk drive head at substantially the same time. The first control signal may be used to generate heat past a blocking temperature of the head to substantially free a magnetic orientation of the head. While the first control signal is being transferred to the heater, a second control signal is transferred to the disk drive head to align a magnetic orientation of the head to a desired magnetic orientation.

46 Claims, 12 Drawing Sheets

160

COMMUNICATIVELY COUPLE CONTROLLER TO HEATER AND TO DISK DRIVE HEAD — 161

PROGRAM CONTROLLER TO TRANSFER FIRST CONTROL SIGNAL TO HEATER AND SECOND CONTROL SIGNAL TO DISK DRIVE HEAD AT SAME TIME — 162

GENERATE HEAT TO DISK DRIVE HEAD PAST BLOCKING TEMPERATURE USING FIRST CONTROL SIGNAL — 163

ALIGN MAGNETIC ORIENTATION OF DISK DRIVE HEAD COMPONENT USING SECOND CONTROL SIGNAL — 164

DISK DRIVE HEAD RESETTING SYSTEM USING SLIDER HEATER

CROSS REFERENCE TO RELATED APPLICATIONS

This patent application claims priority under 35 U.S.C. §119(e) to U.S. Provisional Patent Application Ser. No. 60/542,645, that was filed on Feb. 5, 2004, that is entitled "RESETTING OF MAGNETIC HEADS USING BUILT-IN HEATER AND CURRENT OR A MAGNETIC FIELD," and the entire disclosure of which is hereby incorporated by reference in its entirety herein.

FIELD OF THE INVENTION

The present invention generally relates to the field of disk drives and, more particularly, to a system that resets a magnetic disk drive head using a heater that is not part of the disk drive magnetic head.

BACKGROUND OF THE INVENTION

Disk drive heads are sensitive devices that can be damaged through excessive use and/or excessive electrical stress (e.g., electrostatic discharge, or "ESD"). Head damage may include a misalignment of the magnetic orientation of one the head's components, or layers. For example, a pinned layer of the head is intended to maintain a particular magnetic orientation. A free layer of the head, on the other hand, has a magnetic orientation that moves about freely as the name suggests. The pinned layer and the free layer of a given head operate in tandem to detect electromagnetic impressions on a magnetic disk of the disk drive. Detection of the electromagnetic impressions occurs by means of changing disk drive head resistance due to the changing magnetic orientation of its free layer with respect to its pinned layer. Excessive use and/or excessive electrical stress have a tendency to misalign the magnetic orientation of the pinned layer of the head. When the magnetic orientation of the pinned layer of the head becomes misaligned with respect to an optimal magnetic orientation, detection of magnetic impressions on the disk may be impaired and data quality may degrade.

Certain methods exist which attempt to realign the magnetic orientation of the pinned layer of a head by transferring a pulse of electric current directly to the disk drive head. For example, as electric current is transferred to the pinned layer of the head, the current tends to realign the magnetic orientation of its pinned layer. However, as disk drive head sizes have decreased in an effort to enhance/accommodate increased data storage capacity of the disk drive, the disk drive heads have become increasingly sensitive to certain electrical effects. Because smaller disk drive heads are more electrically sensitive than larger disk drive heads, pulsed electric current methods often exacerbate the problem of magnetic alignment by causing physical damage to the disk drive head, which may not be repairable.

BRIEF SUMMARY OF THE INVENTION

A first aspect of the invention is generally embodied by a disk drive head resetting system. The system has a slider with a disk drive head associated therewith. For example, the disk drive head may be on the slider, affixed to the slider, or incorporated into the structure of the slider. A heater is also associated with a slider and is a different structure than the disk drive head. For example, the heater may be formed/mounted on the slider, or incorporated into the structure of the slider, to heat the disk drive head for purposes of providing a head resetting function. In any case, a controller is communicatively coupled to both the heater and to the disk drive head to transfer a first control signal to the heater and a second control signal to the disk drive head at substantially the same time to establish a magnetic orientation of said head.

The first control signal may be used to heat the disk drive head to a temperature that facilitates resetting of the magnetization on the disk drive head. Any type of heater that provides this function may be utilized. For example, the heater may be a resistive heater coupled to or integrated with the slider, and further may be external to the disk drive head. The heater is preferably electrically isolated from the disk drive head, so that an electrical signal transmitted to the heater is not transmitted to the disk drive head, and vice versa.

The first control signal may be used to passively heat the disk drive head past a blocking temperature of the disk drive head. A blocking temperature as used herein generally refers to a temperature at which a magnetic orientation of one or more components of the disk drive head (e.g., a "pinned layer") is substantially freed. In one embodiment of the invention, the first control signal comprises substantially direct current (i.e., direct current with typical noise fluctuations) of about 40 milliamps. The first control signal may comprise substantially direct current of at least about 25 milliamps in one embodiment, and within a range of about 25 milliamps to about 40 milliamps, inclusive, in another embodiment. The first control signal may be transferred to the heater for no more than about one minute, including at the noted amperages.

The heater may provide multiple functions. For instance, the heater may provide a fly height adjustment function during disk drive operations (e.g., during rotation of a disk while an associated head is "over" this disk), and may be used to provide a head resetting function after disk drive operations have been terminated (e.g., when a head positioner assembly that incorporates the slider is parked on a load/unload ramp). The first control signal that is provided to the heater for a head resetting operation may comprise electric current having a magnitude that is greater than a magnitude of electric current that is provided to this same heater for a fly height adjustment operation. In one embodiment, a control signal of about 20 milliamps may be sent to the heater for fly height control purposes to generate heat which causes a thermal expansion of a portion of the slider and lowers the slider relative to its corresponding disk, and more particularly the disk drive head (i.e., to reduce the fly height). In the present invention, this same heater may be used to heat the disk drive head past a blocking temperature of the disk drive head (e.g., to a temperature of at least 20° C., or Celsius). To generate enough heat to surpass the blocking temperature of the disk drive head, the magnitude of electric current of the first control signal may be greater than the magnitude of electric current used for the fly height adjustment by at least about 50 percent.

With the magnetic orientation substantially freed, the second control signal may be used to align the magnetic orientation of the head. For example, the second control signal as it passes through the disk drive head may create an electromagnetic field that is oriented in a particular direction. Because the electromagnetic moment of the pinned layer is substantially free due to the heat generated with the first control signal, the pinned layer is susceptible to external electromagnetic fields. Accordingly, the electromagnetic field created by the second control signal may establish, or align, the magnetic orientation of the pinned layer in a desired direction. In one embodiment of the invention, the second control signal comprises substantially direct current of no more than about 6 milliamps that is transferred to the head for no more than about one minute. In another embodiment of the invention, the first control signal comprises electric current having a magnitude that is substantially greater than a magnitude of electric current of the second control signal.

The head resetting system may be used at any appropriate time. For instance, the head resetting system may be used during the initial manufacture or assembly of a disk drive. The disk drive head reset of the present invention may also be used to provide the initial magnetization for the head, and may also be used to reset the magnetization of for the head (e.g., when the disk drive head becomes misaligned during some part of the manufacturing/assembly process due to, for example, ESD). Both are considered as "establishing" the magnetic orientation in the case of the first aspect. The head resetting system also may be used after the various components of the disk drive had been enclosed (e.g. disposed between a cover that is detachably interconnected with a base plate), and including after the disk drive has been incorporated into a computer. For instance, a head resetting operation could be undertaken on some periodic or programmed basis after a disk drive has been integrated into a computer, on an "as needed" basis, or both. Typically the head resetting function will be undertaken when the head is parked and when any disk used by the disk drive has quit rotating. The first control signal may then be sent to the heater and the second control signal may be sent to the disk drive head at substantially the same time, as described hereinabove, to reset the disk drive head. With the disk drive head having been reset, read and write operations of the disk drive may resume with improved data quality.

A second aspect of the invention is generally directed to a method of making a disk drive assembly. The disk drive assembly includes a slider that in turn includes a disk drive head and a separate heater. The method includes the steps of communicatively coupling a controller to the heater and to the disk drive head, and programming the controller to transfer a first control signal to the heater and a second control signal to the disk drive head at the same time. The first control signal is used to heat the disk drive head past a blocking temperature of the disk drive head. The method may therefore include a step of using this heating (e.g., to a temperature of at least about 20° C.) to substantially free a magnetic orientation of a disk drive head component (e.g., a pinned layer of the disk drive head). Additionally, the method of the second aspect may include a step of aligning/establishing a magnetic orientation of the disk drive head component using the second control signal.

In one embodiment of the invention, the step of programming the controller to transfer the first control signal includes programming the controller to transfer the first control signal to the heater for no more than about one minute. The step of programming the controller to transfer the second control signal may also include programming the controller to transfer the second control signal to the disk drive head for no more than about one minute. Accordingly, the method may include steps of generating first and second control signals when desired/required to reset the disk drive head. For example, the method may include a step of generating the first control signal to comprise substantially direct current of about at least about 25 milliamps and a step of generating the second control signal to comprise substantially direct current of no more than about 6 milliamps.

The method of the second aspect may be undertaken at any appropriate time. For instance, the entire disk drive need not be assembled to execute the method. Moreover, the second aspect could be integrated into the initial manufacture/assembly of a disk drive. Finally, the method could be integrated as a method of repairing a disk drive head. In accordance with the foregoing, this method could be undertaken while the various disk drive components remain enclosed (e.g., disposed within a space collectively defined by a cover that is detachably connected to a base plate). The disk drive could also be in a disassembled state or in an appropriate pre-assembly state when executing the method of the second aspect.

A third aspect of the invention is generally embodied by a disk drive head resetting system. The disk drive head resetting system includes a slider. The disk drive head resetting system also includes a heater and a disk drive head, each of which is configured with the slider. For example, the disk drive head may be on or part of the slider. The disk drive head resetting system also includes means for generating at least two control signals—a means for transferring a first of the two noted control signals to the heater and a means for transferring a second of the two noted control signals to the disk drive head at substantially the same time. The system further includes means for using the first control signal to heat the disk drive head past a blocking temperature of the disk drive head and means for using the second control signal to establish a magnetic orientation for the disk drive head.

In one embodiment of the invention, the heat is used to substantially free a magnetic orientation of a disk drive head component. The second control signal may be used to align a magnetic orientation of the disk drive head component. For example, the disk drive head component may be a pinned layer of the disk drive head. The heater may be of any appropriate type that passively heats the disk drive head (or another component thereof, such as an antiferromagnetic pinning layer) past a blocking temperature (e.g., to a temperature of at least about 20° Celsius) of the disk drive head component to substantially free a magnetic orientation of the component.

The means for transferring the first control signal may include means for transferring the first control signal to the heater for no more than about one minute. The first control signal may include substantially direct current of at least about 25 milliamps, and including about 40 milliamps. Additionally, the means for transferring the second control signal may include means for transferring the second control signal to the disk drive head for no more than about one minute. The second control signal may include substantially direct current of no more than about 6 milliamps.

In one embodiment of the invention, the heater provides multiple functions. The heater may provide a head resetting function when the head is parked relative to a load/unload ramp. Disk drive operations are not ongoing when the head(s) of the disk drive is parked. This same heater may also be used to provide fly height control during disk drive operations, including while a disk is rotating and while the head is positioned in alignment with the rotating disk (e.g., "flying" in spaced relation to its corresponding disk). The first control signal used for head resetting operations may include electric current having a magnitude that is greater than a magnitude of electric current used for fly height adjustment. The magnitude of electric current of the first control signal may be greater than the magnitude of electric current used for the fly height adjustment by at least about 50 percent. In one embodiment of the invention, the controller is programmed to transfer the first control signal and to transfer the second control signal. This programming may be part of the manufacturing process of the disk drive head resetting system. For example, during the manufacturing process, the controller may be programmed to operate in accordance with the present invention. However, the invention is not intended to be limited to manufacturing processes. Rather, the disk drive head resetting system is also operable after the various components have been enclosed and the disk drive has been released for use. Again, head resetting operations are typically undertaken at a time when disk drive operations are not being performed—typically when each disk of the disk drive is in a stationary position and a head positioner assembly that includes the slider is parked on a load/unload ramp.

A fourth aspect of the invention is generally directed to a method for making a disk drive assembly that includes a step of sending a first control signal to a heater, sending a second control signal to a disk drive head during the step of sending a first control signal, and establishing a magnetic orientation for the disk drive head using both steps of sending. The method may also include a step of programming a controller to send the first control signal to the heater for no more than about one minute. The first control signal may include substantially direct current of at least about 25 milliamps.

In one embodiment of the invention, the method may include a step of programming a controller to send the second control signal to the disk drive head for no more than about one minute. The second control signal may include substantially direct current of no more than about 6 milliamps. The method may further include a step of using the first control signal to heat the head (e.g., to a temperature of at least about 20° C.) to substantially free a magnetic orientation of a disk drive head component (e.g., a pinned layer). With the magnetic orientation of the disk drive head component being at least substantially freed, the magnetic orientation may be aligned to a desired magnetic orientation. Accordingly, the method may include a step of using the second control signal to align the magnetic orientation of the disk drive head component.

A fifth aspect of the present invention is embodied by a disk drive that includes a multi-functional slider heater. The disk drive includes at least one disk, a head positioner assembly, and a load/unload ramp. The head positioner assembly includes at least one slider, that in turn includes a head and a heater. The heater of a particular slider may be operated during disk drive operations to change the spacing between its head and its corresponding disk (i.e., to change the fly height of the slider, and while the disk is rotating). This same heater may be operated with the head positioner assembly being parked on the load/unload ramp to reset or change the magnetization of the head.

Any type of magnetic head may be used in relation to the fifth aspect, including a GMR head (e.g., giant magnetoresistive). Typically the disk drive head will be heated to a much higher temperature for head-resetting operations versus fly height control operations. In one embodiment, at least relevant portions of the head are heated to a temperature of about 10° C. by the heater for fly height control purposes, while at least relevant portions of the head are heated to a temperature of at least about 20° C. by the heater for head resetting purposes. In one embodiment, direct current of at least about 25 milliamps is provided to the heater when being used for head resetting operations, while a current of no more than about 20 milliamps is provided to the heater when being used for fly height control operations.

DETAILED DESCRIPTION OF THE INVENTION

Figure 1:
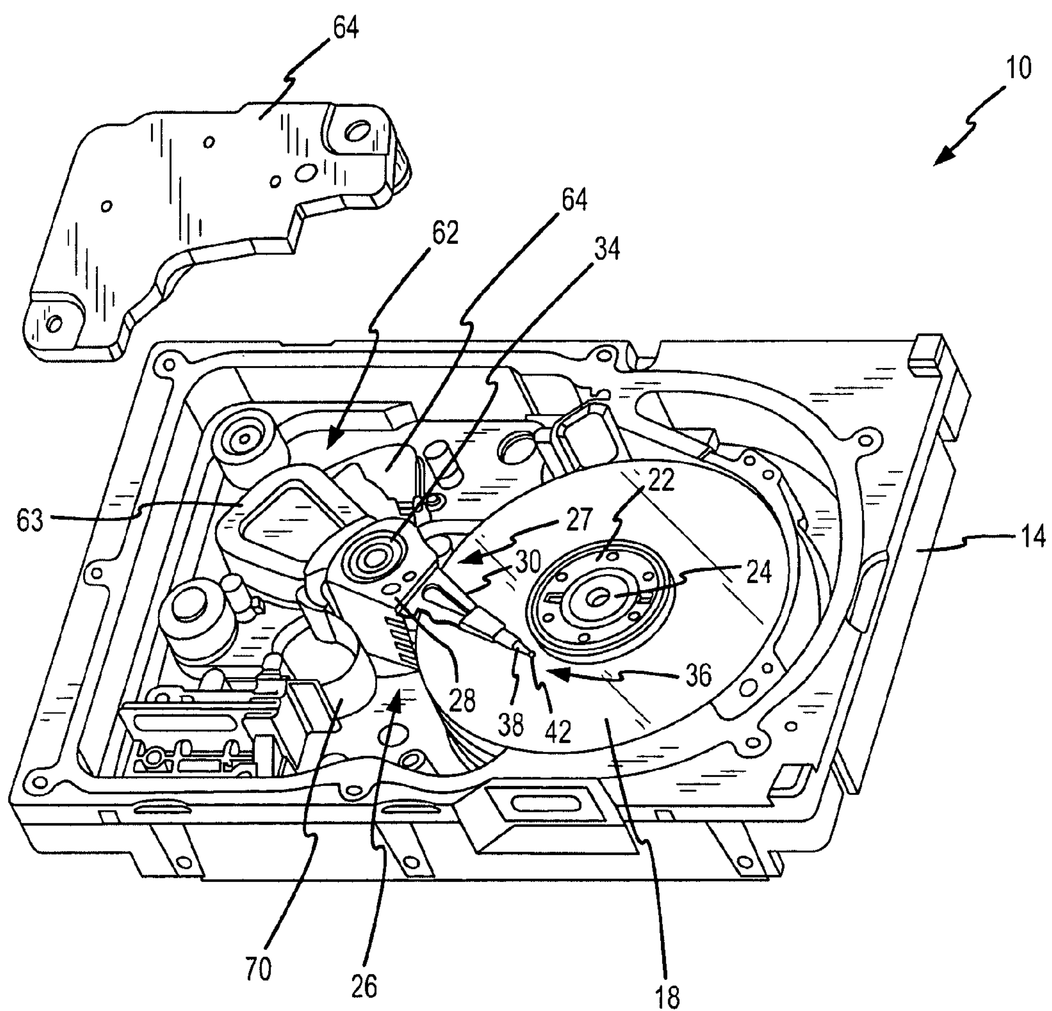
FIG. 1 is a perspective view of a prior art disk drive that may be adapted to incorporate the disk drive head resetting system of the present invention.
Figure 2:
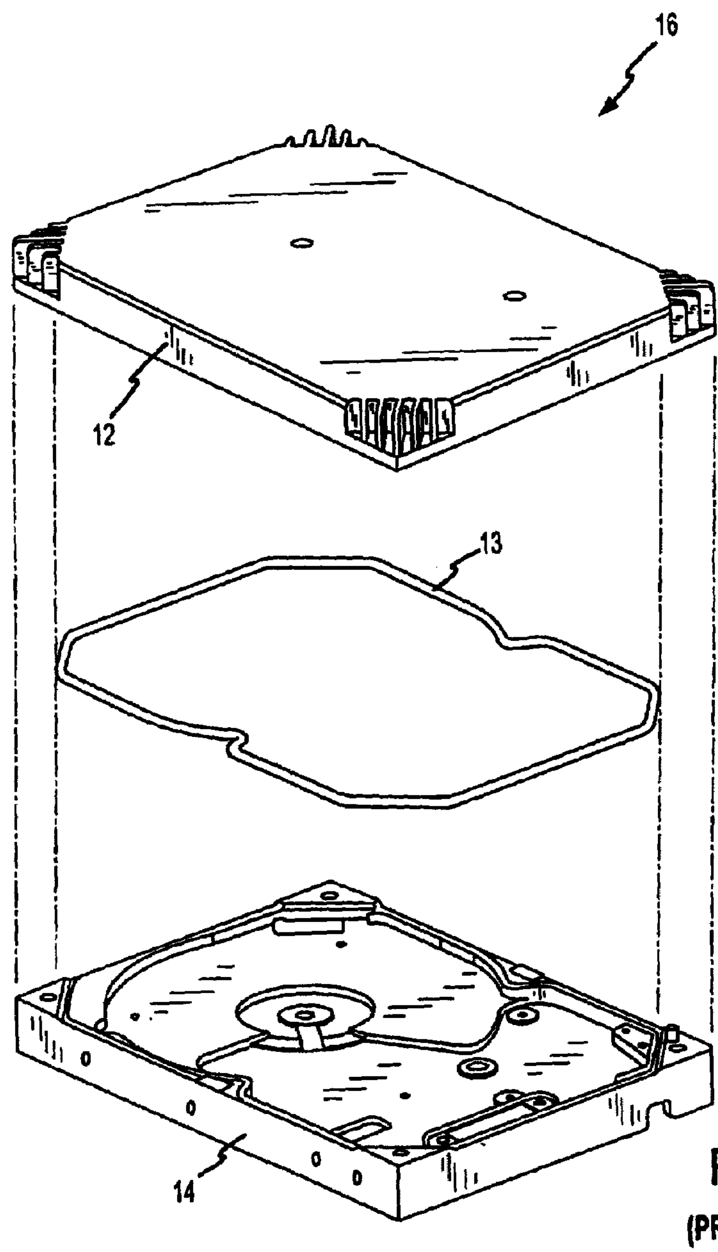
FIG. 2 is an exploded, perspective view of a prior art disk drive housing for the disk drive of FIG. 1.

One embodiment of a prior art disk drive 10 is illustrated in FIGS. 1–4. However, this disk drive 10 may be adapted to incorporate a disk drive head resetting system in accordance with FIGS. 6A–8 that will be discussed below, such an adaptation not being known to be within the prior art. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26 that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM Assembly") 64 that is disposed above and below this coil 63 (the upper VCM assembly 64 being "exploded away" in FIG. 1). The VCM magnet assemblies 64 will typically be mounted on the housing 16 in a fixed position, with the upper VCM assembly 64 being appropriately supported above the lower VCM assembly. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
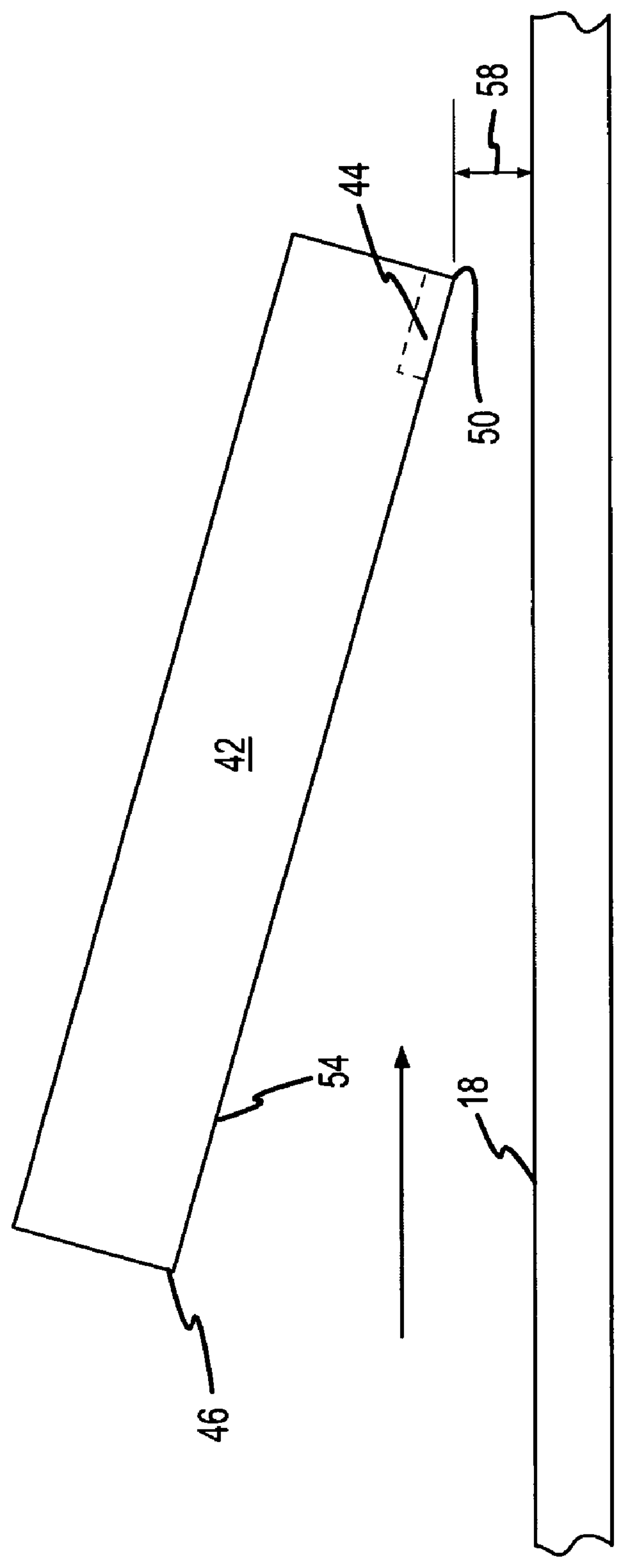
FIG. 3 is a schematic representation of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
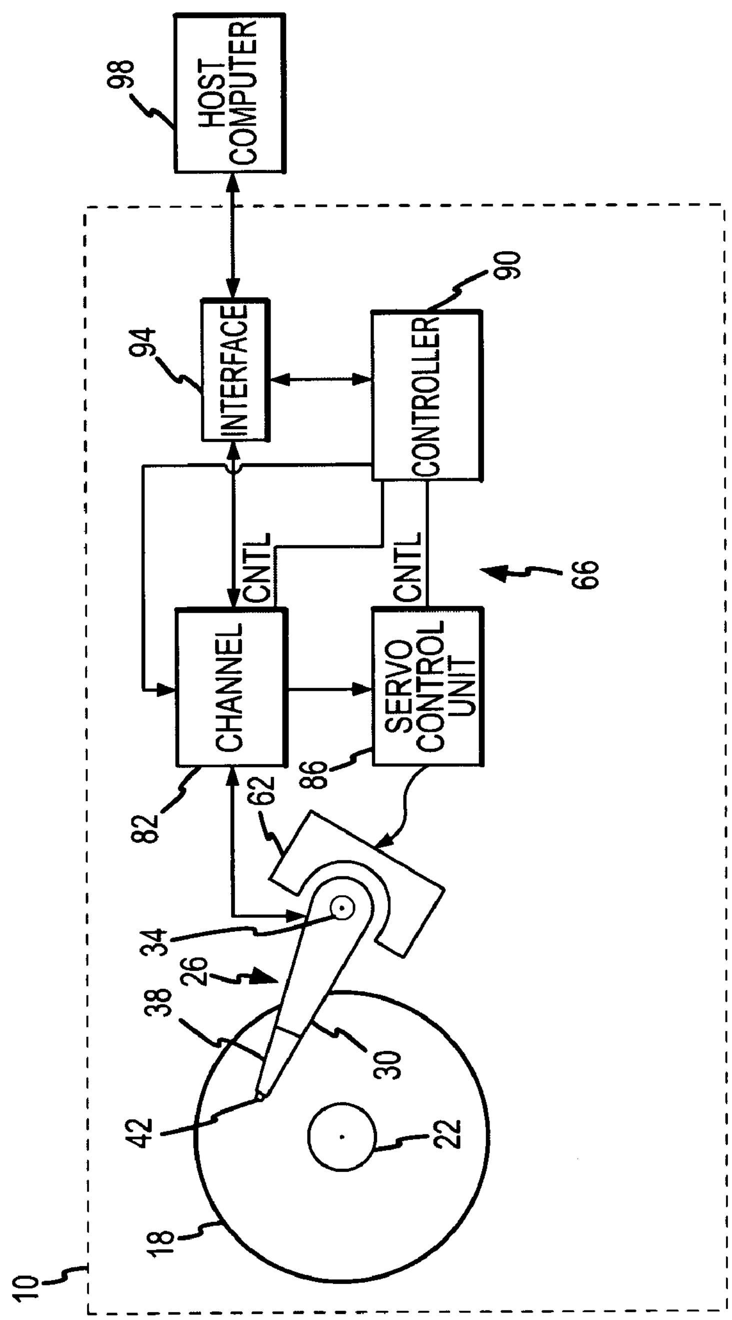
FIG. 4 is a simplified prior art electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

Figure 5A:
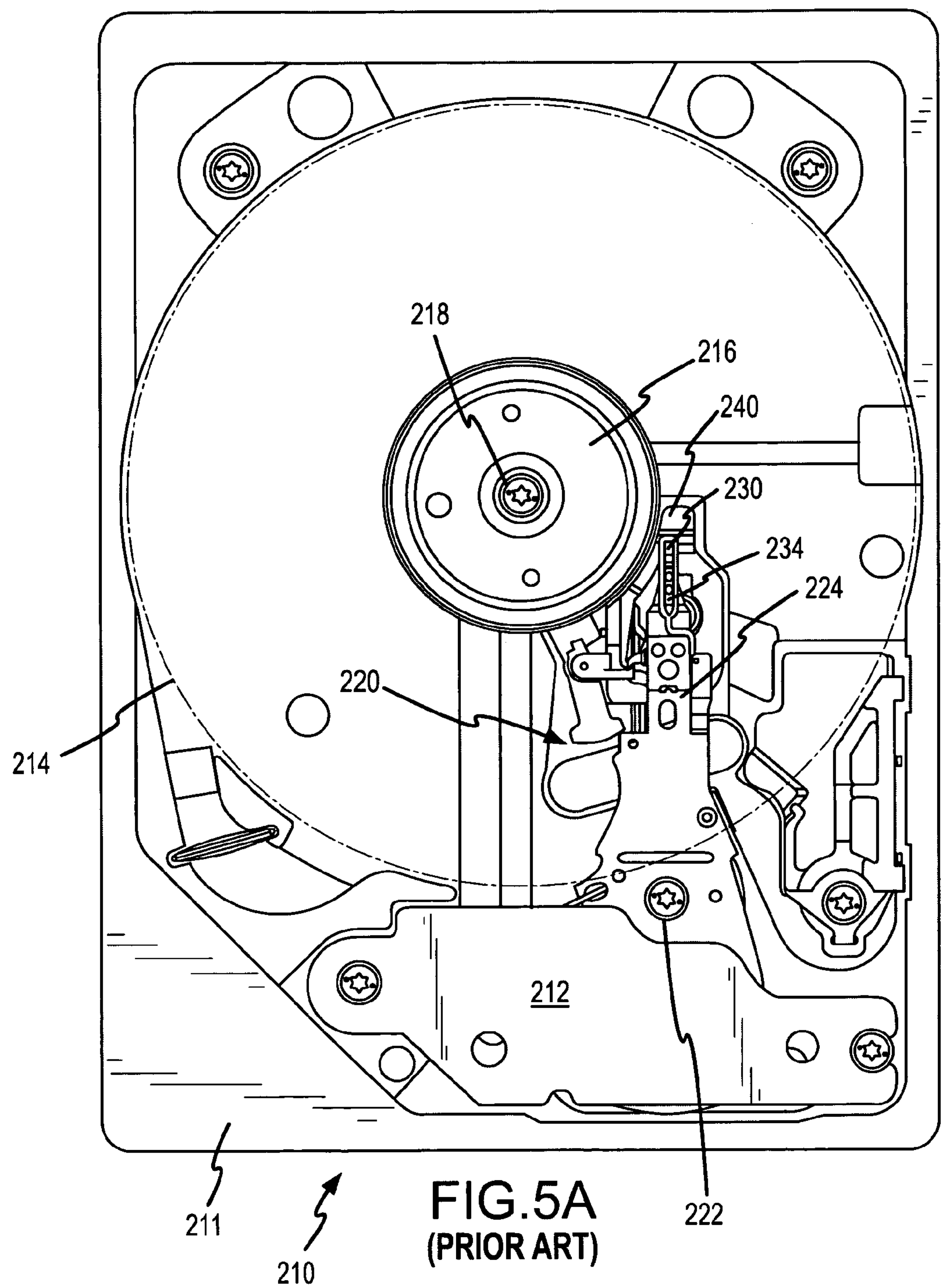
FIG. 5A is a plan view of another prior art disk drive that may be adapted to incorporate the head resetting system of the present invention, such an adaptation not being known to be within the prior art.
Figure 5B:
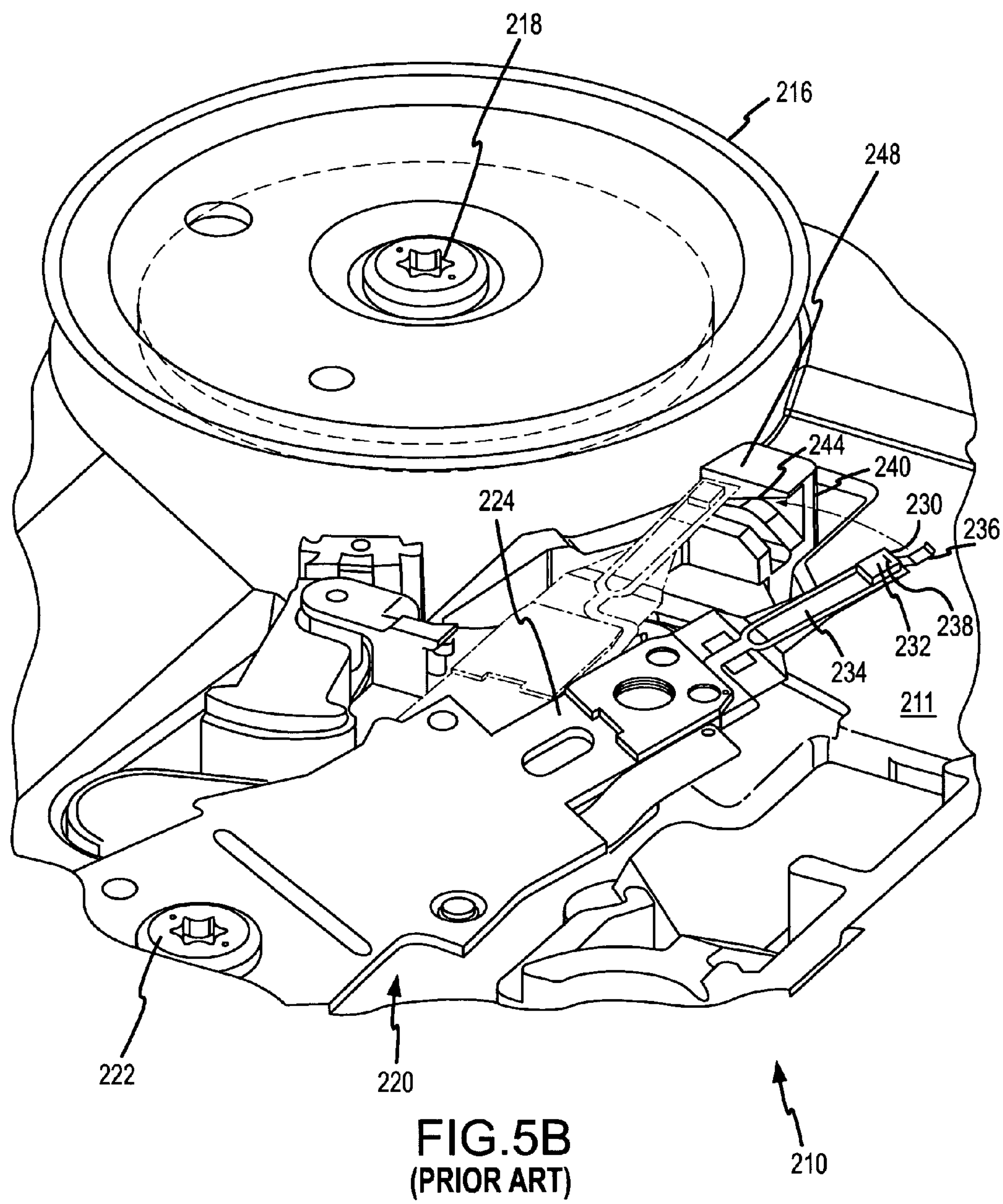
FIG. 5B is a perspective view of part of the disk drive of FIG. 5A, prior to the parking of its head positioner assembly.
Figure 5C:
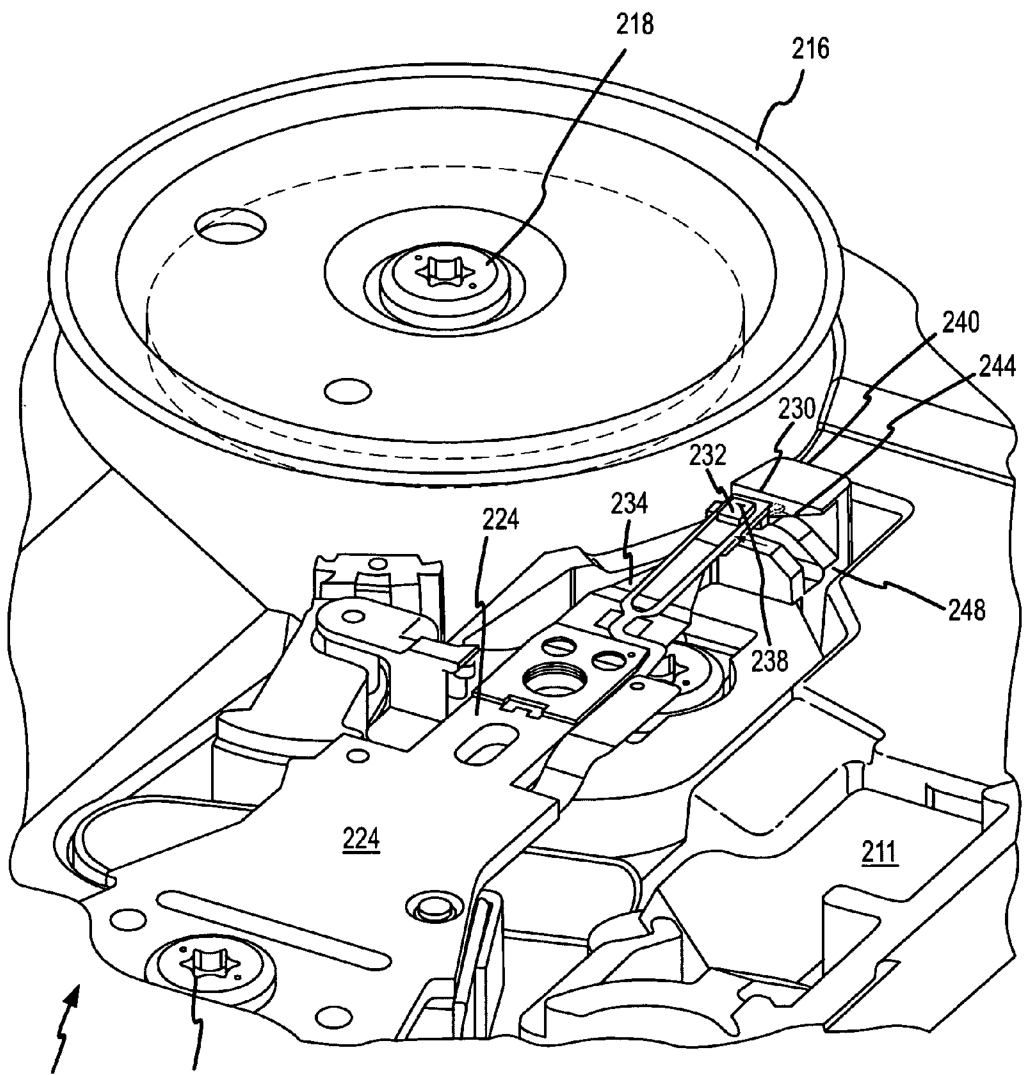
FIG. 5C is a perspective view of part of the disk drive of FIG. 5A, after the parking of its head positioner assembly.

Another embodiment of a prior art disk drive 210 is illustrated in FIGS. 5A–C. However, this disk drive 210 also may be adapted to incorporate a head resetting system in accordance with FIGS. 6A–8 that will be discussed in more detail below, such an adaptation again not being known to be in the prior art. The disk drive 210 generally includes a base plate 211. A cover (not shown) is typically disposed atop the base plate 211 and is detachably attached thereto to define an enclosed space for the various disk drive components. The disk drive 210 further includes a data storage disk 214 of any appropriate computer-readable data storage media. However, the data storage disk 214 of the disk drive 210 has been removed to show various other disk drive components. Accordingly, the data storage disk 214 is only shown in dashed outline in FIG. 5A, and is not illustrated at all in FIGS. 5B–C. The data storage disk 214 is rotated by a spindle motor shaft 218 of a spindle motor, and is coupled therewith by a disk clamp 216.

The disk drive 210 also includes a head positioner assembly 220 which moves about a pivot bearing 222, which in turn is rotatably supported by the base plate 211 of the disk drive 210 and/or cover. FIGS. 5B–C illustrate that the head positioner assembly 220 is positioned between the base plate 211 and the data storage disk 214 (i.e., "under" the data storage disk 214 when the disk drive 210 is disposed in a horizontal orientation such that the cover is above the base plate 211). This head positioner assembly 220 generally includes a rigid actuator arm 224 which extends radially relative to the pivot bearing 222.

A suspension or load beam 234 is appropriately mounted to the actuator arm 224, and includes a lift tab 236 on its distal end or on a distal end of a flexure that may be used to interconnect the slider 230 and the suspension 234. The lift tab 236 may be of any appropriate size/shape/configuration. A slider 230 is appropriately interconnected with the suspension 234 at a location that is "spaced back" from the lift tab 236, or generally in direction of the pivot bearing 222. A "lower" or ABS surface 232 of the slider 230 faces the data storage disk 214, and includes a read/write head 238 of any appropriate type (e.g., giant magnetoresistive (GMR)) for exchanging information with the data storage disk 214.

A voice coil motor (VCM) 212 of the disk drive 210 at least operatively interfaces with the head positioner assembly 220. This VCM 212 generally imparts motion to the head positioner assembly 220 to position the head 238 at the desired radial location of the data storage disk 214. The VCM 212 generally consists of a magnet(s) and a coil (not shown). The VCM 212 is disposed on the opposite side of the pivot bearing 222 in relation to the slider 230 and its head 238.

The disk drive 210 also includes a load/unload ramp 240 having a cam or unloading surface 244 which slopes away from the data storage disk 214 and toward the base plate 211 of the disk drive 210 so as to dispose the slider 230 and the data storage disk 214 in spaced relation when the head positioner assembly 220 is in a "parked" position (e.g., when disk drive operations have been terminated), as shown in FIG. 5C. The cam or unloading surface 244 may be of any appropriate shape. One or more features (not shown) may also be incorporated into the load/unload ramp 240 to provide at least some type of "lock" for the head positioner assembly 220 in its parked position. Typically a body 248 of the load/unload ramp 240 is mounted to the base plate 211 in any appropriate manner (e.g., using one or more screws that threadably engage with the base plate 211).

In the illustrated embodiment, the load/unload ramp 240 is disposed "under" the data storage disk 214 (e.g., generally between the data storage disk 214 and the base plate 211) and at least generally toward a radially inward portion of the data storage disk 214. The load/unload ramp 240 of course could also be disposed beyond a perimeter of the data storage disk 214 (not shown). The load/unload ramp 240 also could be adapted to accommodate the disk drive 210 having a plurality of data storage disks 214, and thereby a head positioner assembly 220 with a plurality of sliders 230, where it would be desirable to simultaneously park each of the plurality of read/write heads when not being used for disk drive operations. Load/unload ramps of this type typically would typically be disposed beyond the perimeter of the stack of spaced data storage disks.

The ABS surface 232 of the slider 230 may be in maintained in spaced relation to the data storage disk 214 during normal disk drive operations by an air bearing. This air bearing forces the slider 230 away from the disk 214. The slider 230 is typically biased toward the data storage disk 214 by the suspension 234 (e.g., to enhance control of the fly height of the slider 230). In the event that there is insufficient pressure acting on the ABS surface 232 of the slider 230, the suspension 234 would typically force the slider 230 into contact with the data storage disk 214. For instance, if rotation of the data storage disk 214 was terminated with the slider 230 being disposed directly under the data storage disk 214 in the illustrated embodiment, the biasing force provided by the suspension 234 would typically force the slider 230 into contact the disk 214. In order to reduce the potential for undesired contact between the slider 230 and the data storage disk 214 when disk drive operations are not being performed (e.g., in order to reduce the potential for the slider 230 "slapping" against the data storage disk 214 if the disk drive 210 is exposed to a force or shock of at least a certain type), which could damage the head 238 and/or the data storage disk 214, the head positioner assembly 220 is parked on or using the load/unload ramp 240.

Parking generally entails the VCM 212 moving the head positioner assembly 220 in the direction of the load/unload ramp 240 such that the lift tab 236 engages the cam or unloading surface 244 of the load/unload ramp 240. Continued movement of the head positioner assembly 220 forces the slider 230 away from the data storage disk 214 by the interaction of the lift tab 236 with the cam or unloading surface 244 of the load/unload ramp 240. Movement of the head positioner assembly 220 is then terminated with the lift tab 236 remaining in contact with the cam or unloading surface 244, which maintains a degree of separation between the slider 230 and the data storage disk 214. A "notch" could be formed in the cam or unloading surface 244 to at least somewhat "lock" the lift tab 236, and thereby the head positioner assembly 220, in this position. This is commonly referred to as a "parked" position for the head positioner assembly 220. Sometimes the head or heads are referred to as being "parked" at this time as well.

Figure 6A:
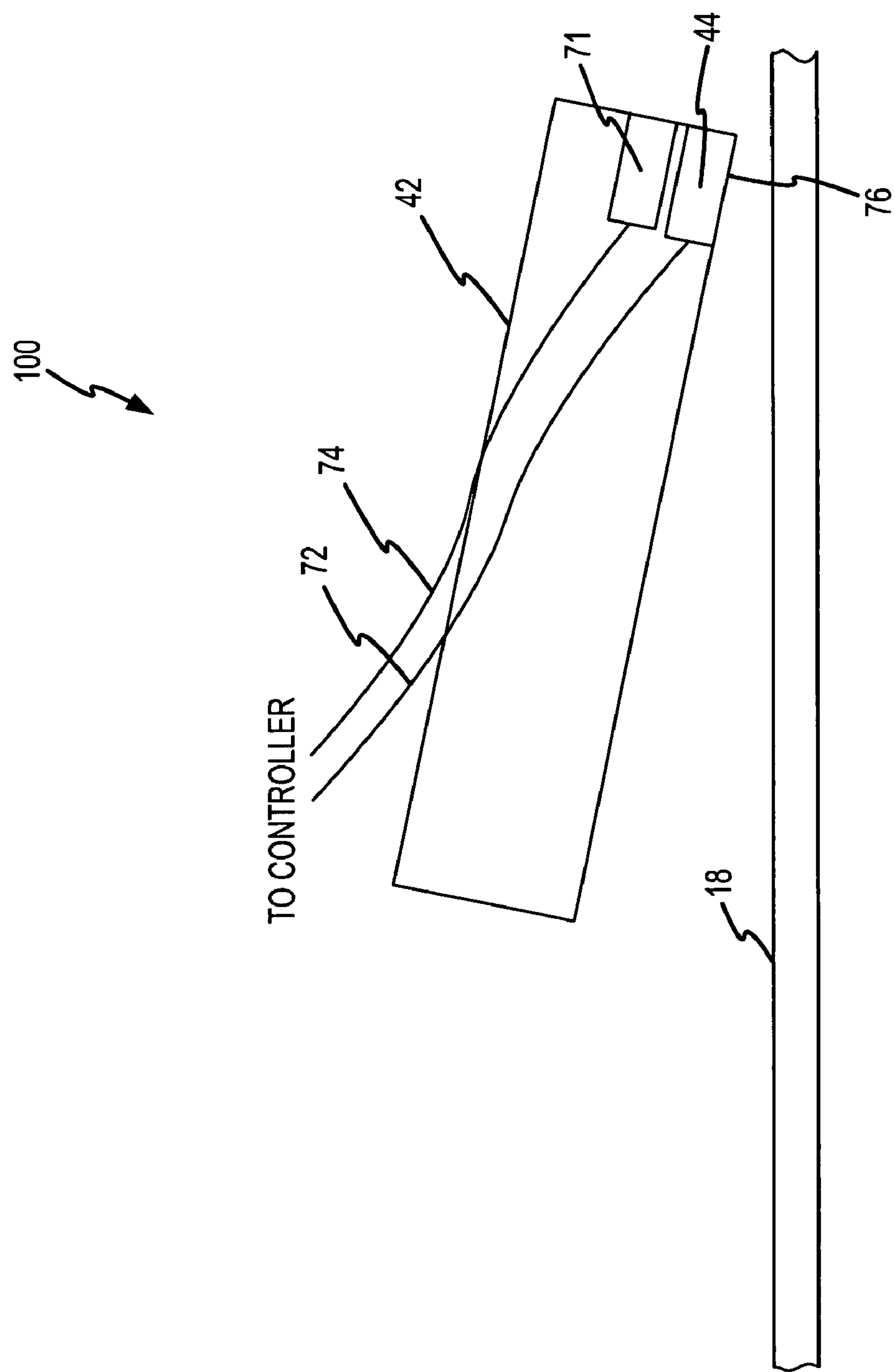
FIG. 6A is a block diagram of one embodiment of a disk drive head resetting system that uses a slider heater.

FIG. 6A is a block diagram of disk drive head resetting system 100 that uses a slider heater of any appropriate type. In this embodiment, slider 42 is configured with a magnetic disk drive head 44 of any appropriate type (e.g., giant magnetoresistive) and a heater 71. Disk drive head 44 and heater 71 are separate structures—that is, the heater 71 is not part of the head 44 and vice versa. For instance, the disk drive head 44 and the heater 71 may be spaced from each other as shown in FIG. 6A. Disk drive head 44 and heater 71 also are preferably electrically isolated from one another to prevent electrical conduction therebetween (e.g., so that an electrical signal provided to the heater 71 is not transmitted to the disk drive head 44, and vice versa).

Control lines 72 and 74 are respectively coupled to disk drive head 44 and heater 71, respectively. The control lines 72 and 74 are further coupled to an appropriate controller (not shown), such as controller 90 described hereinabove, via for example flex cable 70. Control lines 72 and 74 are each coupled to the controller for conveying control signals. For example, control line 74 may convey a control signal to heater 71 to passively heat disk drive head 44 past a blocking temperature of a disk drive head component, such as a antiferromagnetic layer of the disk drive head 44. Raising the temperature of the disk drive head component past a blocking temperature of the component tends to free a magnetic orientation of the component. In one embodiment, the temperature is raised as large as possible without damaging disk drive head 44 (e.g., roughly between 80 and 100° C.). In one embodiment, the temperature of the disk drive head 44 is raised to at least about 20° C., and to a temperature within a range of about 20° C. to about 80° C. in another embodiment (inclusive). With the magnetic orientation having been freed, the control signal transferred to disk drive head 44 via control line 72 may be used to align the magnetic orientation of the disk drive head component. Typically the slider 42 will be in parked condition or state when a head resetting operation is undertaken using the head resetting system 100. Preferably, a head resetting operation using the head resetting system 100 will be undertaken after the disk 18 has stopped rotating, after the head positioner assembly 26 has been parked on an appropriate load/unload ramp (e.g., the load/unload ramp 240 of FIGS. 5A–C), and more preferably after both have occurred.

The control signal conveyed via control line 74 is an electric current signal (e.g. substantially direct current) having a magnitude on the order of about 40 milliamps in one embodiment, and greater than about 25 milliamps in another embodiment. Additionally, the control signal conveyed via control line 72 may be an electric current signal (e.g. substantially direct current) having a magnitude on the order of about six milliamps in one embodiment, a magnitude of no more than about 6 milliamps in one embodiment, a magnitude within range of more than 0 milliamps to no more than about 6 milliamps in another embodiment, and a magnitude that is greater than a bias current that may flow through the head 44 in yet another embodiment (e.g., at least some designs for disk drive heads 44 have a bias current of about 3 milliamps, such that a current of at least slightly more than about 3 milliamps could be used for head resetting operations). As control line 74 conveys a control signal to heater 71 to provide or at least contribute to this heating, control line 72 may simultaneously convey a control signal to the disk drive head 44 to align a magnetic orientation of the disk drive head component. For example, control lines 72 and 74 may convey their respective control signals at substantially the same time. Accordingly, the combination of control signals being applied to heater 71 and disk drive head 44 may collectively have the effect of aligning the magnetic orientation of the disk drive head 44 in a desired magnetic orientation. In a preferred embodiment, the control signals are transferred to heater 71 and disk drive head 44 for a period of time no more than about one minute. In one embodiment, the control signal is transmitted to the heater 71 for a period of time prior to beginning transmission of the control signal to the disk drive head 44. In another embodiment, the control signals provided to the heater 71 and the disk drive head 44 and are coterminous.

The heater 71 may be of any appropriate configuration that is able to heat to disk drive head 44 so as to allow for/enhance the setting or resetting its magnetization. The heater 71 may also be used to provide any appropriate additional function. In one embodiment, heater 71 is in the form of a fly height adjustment heater which is used to adjust the height between the slider 42 and the disk 18 through thermal expansion of at least part of the slider 42. That is, the heater 71 may be used to change the height at which the slider 42 flies above the disk 18 during disk drive operations, where the disk 18 is rotating at a desired speed. In this case, the heater 71 would provide multiple functions. One function again would be for the heater 71 to be operated to provide a setting or resetting function for the magnetization of the head 44, typically again at a time when the head position or assembly 26 has been parked on a load/unload ramp. The heater 71 can also be used during disk drive operations to adjust the fly high to the slider 42 as desired/required.

Figure 6B:
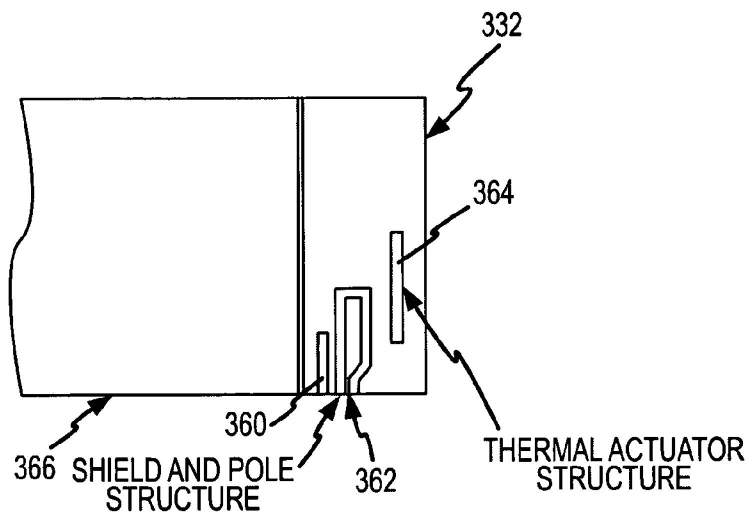
FIG. 6B is one embodiment of a slider with a fly height adjustment heater that may be used by the head resetting system of FIG. 6A.
Figure 6C:
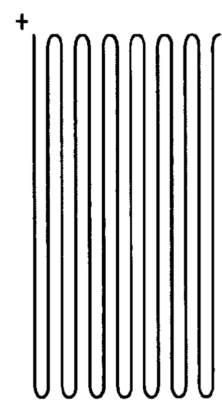
FIG. 6C is one particular configuration for the fly height adjustment heater of FIG. 6B.
Figure 6D:
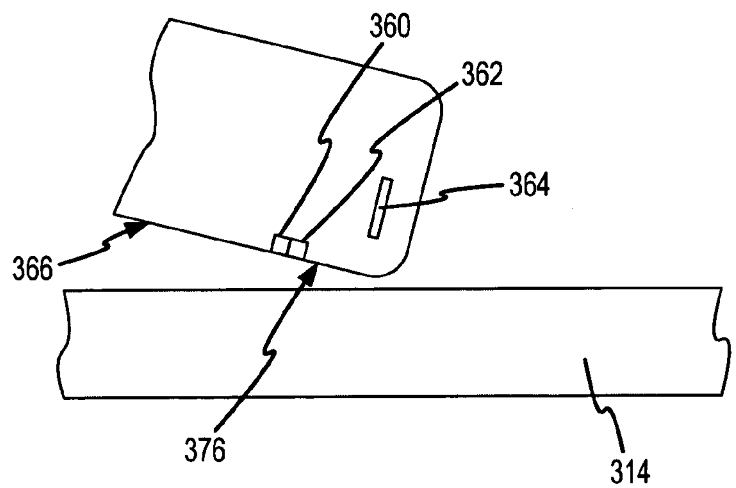
FIG. 6D illustrates one embodiment of an operation of the fly height adjustment heater of FIG. 6B.

Representative fly height control heater configurations that may be appropriate for the heater 71 in the head resetting system 100 of FIG. 6A, and that may provide both a head resetting function and a fly height adjustment function in accordance with the foregoing, are disclosed in commonly assigned U.S. patent application Ser. No. 10/859,917, that is entitled "THERMAL ACTUATOR DESIGN FOR HARD DISK DRIVE MAGNETIC RECORDING," that was filed on Jun. 3, 2004, and the entire disclosure of which is incorporated by reference in its entirety herein. FIGS. 6B–D illustrate one embodiment of a slider 332 that incorporates one embodiment of a fly height adjust or adjustment heater 364, and that may be used in place of the heater 71 of the head resetting system 100 of FIG. 6A. That is, the heater 71 of the head resetting system 100 of FIG. 6A may be in the form of the fly height adjust heater 364 of FIGS. 6B–D, and thereby may also provide a fly height adjustment function in the manner to be described herein.

In the case of FIGS. 6B–D, the illustrated portions of the read transducer and write transducer that are carried by the slider 332 are a read shield 360 and a write shield/pole structure 362. A thermal actuator or heater 364 is also located in the slider 332 adjacent to the write shield/pole structure 362 and displaced above an air-bearing surface 366 of the slider 332. This heater 364 may be used to adjust the fly height of the slider 332 in a manner that will be discussed in more detail below.

The heater 364 may be a coil structure of a conductive material such as $Ni_{80}Fe_{20}$ (permalloy), $Cu_{60}Ni_{40}$ (constantan), $Cu_{88}Sn_{12}$ (bronze), and $Cu_{97.5}Mn_{3.5}$. The two primary considerations in choosing a material are first its resistivity, which together with the length and cross-section determines the resistance of the structure, and which also impacts the resistance of the leads, and second its thermal coefficient of resistance (see below). One example of a possible coil structure for the heater 364 is shown in FIG. 6C. The coil structure shown in FIG. 6C is a serpentine path of conductive metal film. Other suitable coil shapes could also be employed. Instead of a coil, the heater 364 could also take some other suitable shape, such as a film heater or a resistive film heater. This arrangement may be preferable in applications where it is desired to use a conductor of relatively higher resistivity. It has also been determined that sharp corners in coils and other shapes may not be desirable as the small radius of curvature can result in high current densities.

The thickness of the conductor and its electrical resistivity are chosen to provide the greatest power dissipation given constraints on current and voltage supply. A thin, sputtered film of high resistivity material (e.g., greater than 3 μΩ·cm) may be used for manufacturability and tolerance control reasons. In particular, the coil structure shown in FIG. 6C should be relatively easily produced with this type of high resistivity material. It may be desirable to use low TCR (temperature coefficient of resistance) material for the conductor of the heater coil so that the resistance of the coil does not vary too much with temperature or operating power, so that maximum heat dissipation can be achieved by the heater (under given voltage and current constraints). One such low-TCR material that has been tested is $Cu_{60}Ni_{40}$. The geometry of FIG. 6C may include a wire cross-section of 1.5 μm by 1.5 μm. The wire length may be 2600 μm. The wire spacing may be 0.6 μm. The wire material may be Ni—Fe. The wire resistivity may be 21 μΩ·cm. The wire resistance may be 242 Ω. The heater DC current may be 20 mA for fly height adjustment operations. The heater voltage may be 4.8 V. The height of the coil may be 86 μm. The width of the coil may be 31.2 μm.

The total resistance (R) of the heater 364 is optimally the resistance that dissipates the greatest amount of heat using the greatest electrical current the system can deliver. This maximum electrical current can be denoted as $I_{max}$. The dissipated heat can be described by the expression $I_{max}^2R$. The largest resistance that allows the current $I_{max}$ to flow is given by $R=V/I_{max}$ where V is the system voltage. For example, a disk drive system with a system voltage of 5v and a maximum current of 20 mA would require an optimum heater resistance of 250 Ω, and would theoretically generate 100 milliwatts. Alternatively, one may choose a smaller heater resistance to allow a transient high power boost greater than the target steady-state power, thus reducing the time to reach the target actuation. DC current or sufficiently low frequency AC current could be used.

Current to the heater 364 is provided by either a preamplifier chip (not shown), which also provides power to the read and write transducers, or by separate power control circuitry. Current may be delivered via an electrical connector pad at the trailing end of the slider 332, such as is typically used to deliver current to the write transducer.

The return path for current (the ground path) may also be provided by a connector pad at the slider trailing end, as is conventionally provided for the write transducer. Alternatively, the heater 364 may be grounded to the suspension via a path within the slider body or on its surface.

As can be seen in FIG. 6D, when the heater 364 is actuated, the portion 376 of the slider 332 in the vicinity thereof (including the portion containing the read/write transducers 360 and 362) expands due to the heat produced by actuating the heater 364. This expansion causes the ABS 366 in the vicinity of the heater 364 to distort in a controlled manner so as to be closer to the surface of the disk 314. In this manner, the minimum fly height and the gap fly height can be controlled and made small when desired. At other times, the minimum fly height and the gap fly height can be left at a greater stand off distance to reduce the likelihood of contact with the disk 314. It has been determined that the time constant for actuation is in the range of 1 millisecond. This means that the ABS 366 should have moved 90% of its full travel within approximately 3 milliseconds following a step change in power. Using a form of power delivery commonly called "boost," the expansion can be accelerated by over-adjusting power toward the desired target for the initial phase of actuation (e.g. one time constant). It appears that the time constant for the change in actuation due to a step function application or removal of power is roughly the same for cooling as the time constant for heating.

Once the transducers are positioned closer to the disk surface by this actuation, the disk drive system is capable of higher (frequency) performance reading and writing. It should be emphasized, however, that even in the non-actuated or retracted position, the read transducer could still be utilized to read the relatively-lower frequency servo pattern.

As noted above, an electric current of about 20 milliamps may be used to provide fly height adjustment using the heater 364. Using this same heater 364 in the head resetting system 100 of FIG. 6A may require that a much larger electrical signal be provided the heater 364 to heat the slider 42 to a temperature for setting a resetting the magnetization of the and 44 in accordance with the foregoing. In one embodiment and as previously noted, at least substantially direct current of at least about 25 milliamps may be provided to the heater 71 to heat the head 44 for setting or resetting its magnetization. In another embodiment and as also previously noted, at least substantially direct current of about 40 milliamps may be provided to the heater 71 to heat the head 44 for setting or resetting its magnetization. Therefore, when used during head resetting as described herein, the magnitude of electric current of this control signal used for passively heating disk drive head 44 past a blocking temperature may, in one embodiment, have a magnitude that is at least 50 percent greater than the control signal used for fly height adjustments.

Another way of characterizing the operation of the heater 71 for providing head resetting versus fly height adjustment functions is in relation to the temperature of the slider 42. Typically the heater 71 will be operated to heat the head 44 to a temperature of about 10° C. for fly height adjustment. On the other hand, the heater 71 may be operated in such a way as to heat the head 44 to a temperature of at least about 20° C. for head resetting purposes in one embodiment, and to a temperature within a range of about 20° C. to about 80° C. in another embodiment. That is, a control signal that is at least 50 percent greater may be transmitted to the heater 71 for head resetting purposes in comparison to a control signal that may be transmitted to the same heater 71 for fly height adjustment. Additionally, the control signal used for heating disk drive head 44 (that which is transmitted to the heater 71 through control line 74) for head resetting purposes may be substantially greater in magnitude than the control signal that is transmitted to the head 44 for aligning a magnetic orientation of disk drive head 44 (i.e., the control signal that is transmitted to the head 44 through control line 72).

The disk drive head resetting system 100 of FIG. 6A may be used during the manufacturing process to set (the initial magnetization) or reset (e.g., correct or adjust the magnetization) of the disk drive head 44. For example, disk drive 10 may be vulnerable to ESD at various points during the assembly process. Such ESD may damage disk drive head 44 by misaligning the magnetic orientation of disk drive head 44. The control signals transferred via control line 72 and 74 may be used during the manufacturing process to realign the magnetic orientation of the disk drive head 44. However, disk drive head resetting system 100 is not limited to resetting a head during a manufacturing process. Rather, disk drive head resetting system 100 may be used after assembly and after the disk drive 10 has been released for consumer use. For example, once assembled, disk drive 10 may be used to perform typical disk drive operations, such as read and write operations within a computer. Extensive read and write operations of disk drive 10 may tend to misalign disk drive head 44. Disk drive head resetting system 100 may, therefore, be used to reset disk drive head 44 after some use period of typical disk drive operations. During the disk drive head 44 reset process, disk drive 10 may "park" disk drive head 44 as described hereinabove. Disk drive 10 may then transfer control signals via control line 72 and 74 as described herein to reset disk drive head 44.

Figure 6E:
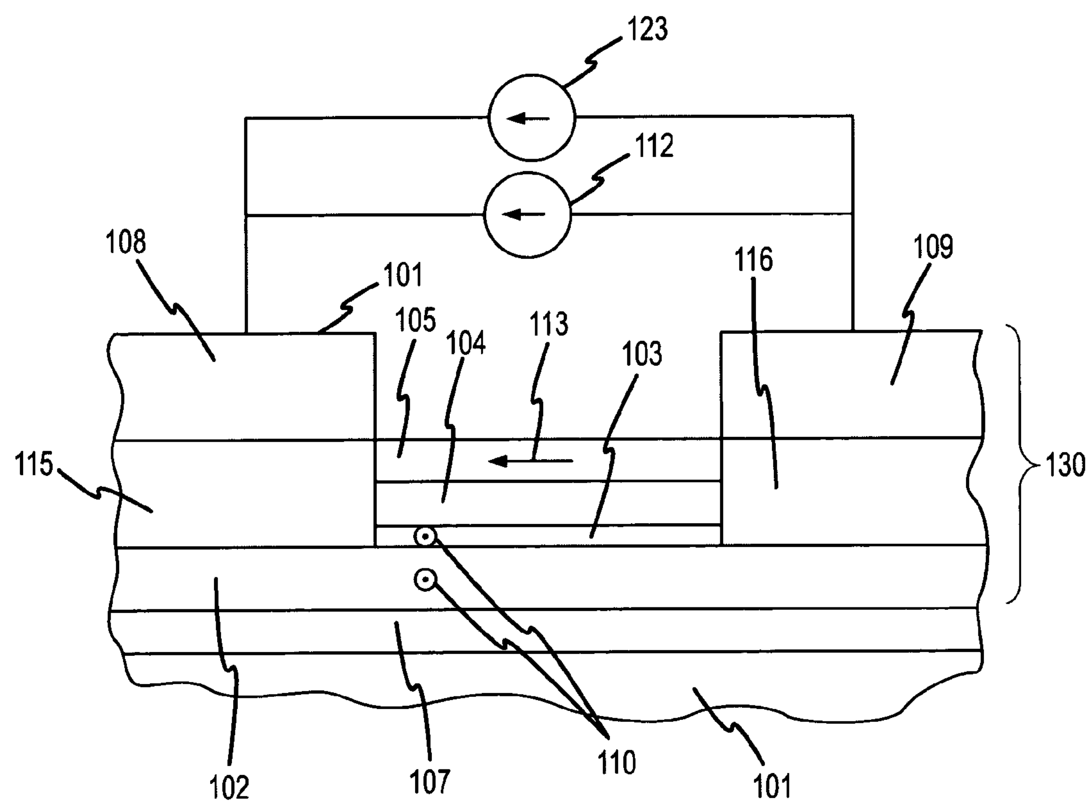
FIG. 6E depicts an exemplary schematic view of a spin valve sensor that may form a part of a disk drive head.

FIG. 6E depicts an exemplary schematic view of a spin valve sensor 130 of one configuration for a part of disk drive head 44. The view presented in FIG. 6E is a plan view of the air-bearing surface (ABS) of the slider, or that surface of the slider that at least generally faces its corresponding disk during disk drive operations. Only a portion of the ABS is illustrated in FIG. 6E, including part of a substrate 101 from which the slider is fabricated. Spin valve sensor 130 is but one type of head configuration that could be reset by the head resetting system 100.

Spin valve sensor 130 includes a plurality of substantially parallel layers including an antiferromagnetic pinning layer 102, a ferromagnetic pinned layer 103, a conductive layer 104 and a ferromagnetic free layer 105. Spin valve sensor 130 also includes hard bias layers 115 and 116, the operation of which is discussed in greater detail below herein. Spin valve sensor 130 is deposited upon an insulator 107, which lies atop substrate 101.

Antiferromagnetic pinning layer 102 comprises a type and thickness of antiferromagnetic substance, such as NiO, suitable for use in spin valves. Ferromagnetic pinned layer 103 comprises a type and thickness of ferromagnetic substance, such as Co, suitable for use in spin valves. Conductive layer 104 comprises a type and thickness of conductive substance, such as Cu, suitable for use in spin valves. Ferromagnetic free layer 105 comprises a type and thickness of ferromagnetic substance, such as NiFe, suitable for use as a free layer in spin valves. Hard bias layers 115 and 116 provide ferromagnetic free layer 105 with a desired quiescent magnetization. Hard bias layers 115 and 116 preferably comprise a magnetic material with high coercivity, such as CoPtCr.

Despite the foregoing detailed description of spin valve sensor 130, other sensor arrangements may exist that are configurable with the disk drive head resetting system described herein. For example, those of ordinary skill and having the benefit of this disclosure will recognize various alternatives to the specific materials described above and the design choice thicknesses thereof.

Spin valve sensor 130 exhibits a predefined magnetization. Magnetization of spin valve sensor 130, including ferromagnetic pinned layer 103 and ferromagnetic free layer 105 and antiferromagnetic pinning layer 102 may be magnetized prior to initial operation, such as during the fabrication or assembly processes. Alternatively, spin valve sensor 130 may be magnetized after some period of operating spin valve sensor 130, where spin valve sensor 130 loses its magnetic orientation due to a traumatic high temperature event such as electrostatic discharge.

Whether magnetized before or after initial operation of spin valve sensor 130, the magnetized components of spin valve sensor 130 are configured with a specified magnetic orientation. In particular, antiferromagnetic pinning layer 102 has a magnetic orientation in a direction 110. For ease of explanation, conventional directional shorthand is used herein, where a circled dot indicates a direction coming out of the page (e.g., like an arrow's head). The neighboring ferromagnetic pinned layer 103 has a magnetic moment pinned in a parallel direction 110, due to antiferromagnetic exchange coupling between antiferromagnetic pinning layer 102 and ferromagnetic pinned layer 103.

Unlike ferromagnetic pinned layer 103, ferromagnetic free layer 105 has a magnetic moment that freely responds to external magnetic fields, such as those from a magnetic storage medium. Ferromagnetic free layer 105 responds to an external magnetic field by changing its magnetic moment, which in turn changes the resistance of spin valve 130. In the absence of other magnetic fields, ferromagnetic free layer 105 orients itself in a direction 113, which is orthogonal to the directions 110 of ferromagnetic pinned layer 103 and antiferromagnetic pinning layer 102. This quiescent magnetization direction is due to biasing of ferromagnetic free layer 105 by hard bias layers 115 and 116.

Spin valve sensor 130 may also include various components to direct electric current and magnetic fields through spin valve sensor 130. A small but constant sense current, for example, is directed through spin valve sensor 130 to provide a source of scattering electrons for operation of spin valve sensor 130 according to the GMR effect. FIG. 6D depicts spin valve sensor 130 in relation to the various components that help direct current through spin valve sensor 130. For example, spin valve sensor 130 can be attached to a pair of complementary leads 108 and 109 that form control line 72 of FIG. 6A to facilitate electrical connection to a first current source 112 that provides a source of scattering electrons for operation of spin valve sensor 130 according to the GMR effect. Leads 108 and 109 may be configured from any thickness and type of conductive material suitable for leads with spin valve sensor 130, such as Ta with a Cr underlayer. The attachment of leads to magnetoresistive spin valve sensors and spin valves as described herein is a well known technique and familiar to those of ordinary skill in the art.

Leads 108 and 109 may also facilitate electrical connection to a second current source 123. Via leads 108 and 109, second current source 123 directs an electric current through ferromagnetic pinned layer 103. The electric current of second current source 123 also provides a magnetic field that magnetically orients antiferromagnetic pinning layer 102 in accordance with the well known right-hand rule of electromagnetics. During a disk drive head reset operation as described hereinabove, a control signal comprising an electric current of no more than about 6 milliamps is directed through spin valve sensor 130 for less than about one minute to establish the magnetization direction of spin valve sensor 130. Those skilled in the art should readily recognize that first current source 112 and second current source 123 may be implemented with a single current source. The operational characteristics of first current source 112 and second current source 123 are exemplarily illustrated as separate devices to illustrate the differing functionality of the electric current signals thereof.

After resetting the magnetic orientation of ferromagnetic pinned layer 103 using the disk drive head reset operation described hereinabove, the magnetic orientation of antiferromagnetic pinning layer 102 has the effect of pinning the magnetization directions of ferromagnetic pinned layer 103. This occurs because of the exchange coupling between antiferromagnet-ferromagnet pairing of antiferromagnetic pinning layer 102 and ferromagnetic pinned layer 103. More particularly, antiferromagnetic pinning layer 102 pins ferromagnetic pinned layer 103 in a direction parallel to its own direction.

While one embodiment has been shown and described herein, the invention is not intended to be limited to the illustrated embodiment. For example, other types of heaters spaced about the disk drive head 44, in slider 42 or on slider 42 may be used to passively heat a disk drive head component and substantially free a magnetic orientation of that component. Such a heater(s) is preferably electrically isolated from the disk drive head 44. Additionally, those skilled in the art should readily recognize that the controller may be controller 90 described hereinabove or some other controller, such as a general-purpose processor, which is programmed to convey a plurality of control signals such as those described herein.

Figure 7:
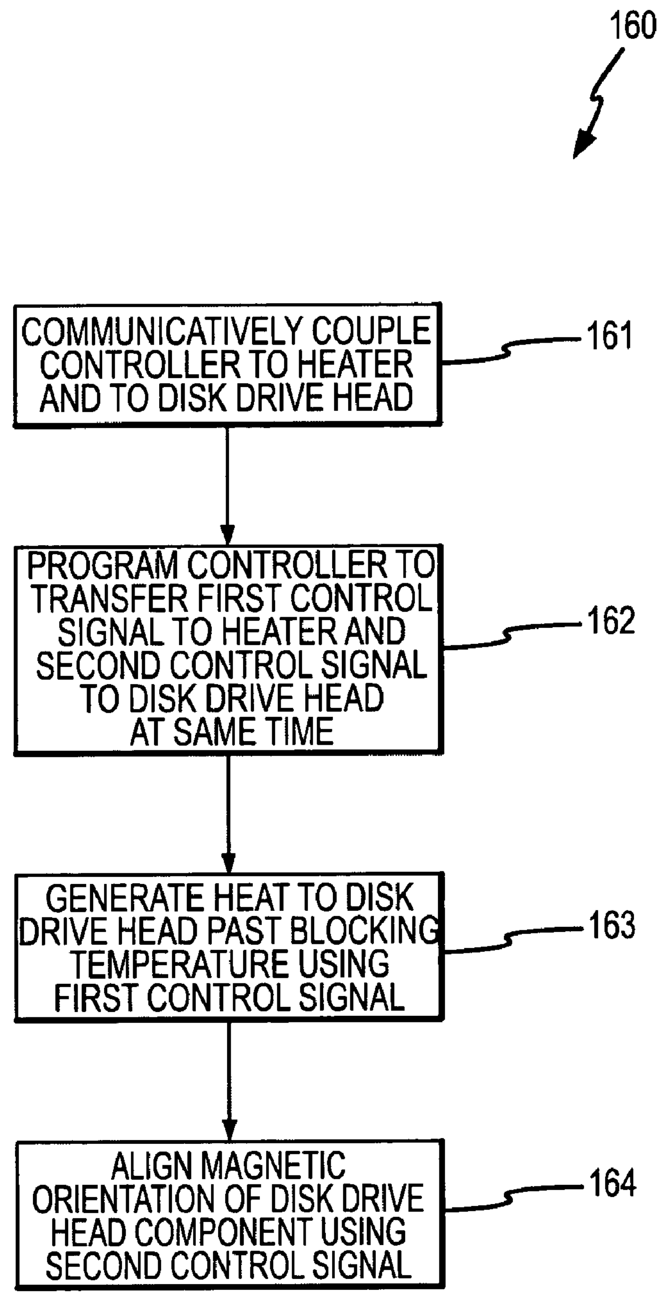
FIG. 7 is a flowchart of one protocol that may be associated with the disk drive head resetting system.

FIG. 7 is a flowchart of one embodiment of a head resetting protocol 160 that may be used by the disk drive head resetting system 100 of FIG. 6A. In this embodiment, protocol 160 includes a step of communicatively coupling a controller (e.g., controller 90 described hereinabove) to heater 71 and to disk drive head 44, in step 161. The protocol 160 also includes a step of programming the controller to transfer a first control signal (e.g., via control line 74) to heater 71 and a second control signal (e.g., via control line 72) to disk drive head 44 at the same time, in step 162. For example, the first control signal may be transferred to heater 71 for a period of no more than about one minute. During that same time, the second control signal may be transferred to disk drive head 44.

The protocol 160 also includes a step 163 in which the first control signal is used to heat the disk drive head 44 past a blocking temperature (e.g., of at least about 20° C.) of the disk drive head 44. For example, the first control signal may include electric current of about 40 milliamps and the heater 71 may be a resistive heater which generates heat upon receiving the first control signal. The heat generated may be sufficient to passively heat disk drive head 44 past a blocking temperature of disk drive head 44 in which a magnetic orientation of a disk drive head component is substantially freed. Preferably, the heat generated is at a temperature between about 20° C. and about 80° C., or possibly to a higher temperature so long as such a higher temperature would not cause physical damage to the disk drive head 44.

In one embodiment and as noted above, the heater 71 is in the form of a fly height adjust heater that controls the fly height between the disk drive head 44 and the disk 18 during disk drive operations. The control signal used for fly height adjustment may have an electric current that is substantially less in magnitude than that of the control signal used for generating heat past a blocking temperature of disk drive head 44 for head resetting purposes. For example, the first control signal transmitted to the heater 71 when being operated for head resetting may comprise electric current that is at least 50 percent greater in magnitude than the electric current transmitted to the heater 71 when being operated for fly height adjustment.

The protocol 160 also includes a step 164 of aligning a magnetic orientation of the disk drive head component using the second control signal (e.g. via control line 74). For example, while the first control signal is used to generate heat to the disk drive head component (e.g., antiferromagnetic pinning layer 102) and thereby substantially free a magnetic orientation of the component, the second control signal may be transferred to the disk drive head 44 to align a magnetic orientation of the disk drive head component. Transferring the second control signal may include passing an electric current through a disk drive head component (e.g., antiferromagnetic pinned layer 103 and/or ferromagnetic pinning layer free layer 105, both of FIG. 6E) of disk drive head 44. Conduction of the electric current in a particular direction has the effect of aligning the magnetic orientation of the pinned layer according to the well-known “right hand rule” of electromagnetics. The electric current of the second control signal may have a magnitude of no more than about 6 milliamps in one embodiment as noted. As such, the first control signal may include an electric current that is substantially greater in magnitude than that of the second control signal.

Protocol 160 as described herein may be used in the manufacturing process or after the various components of the disk drive have been enclosed between the cover and base plate. For example, the steps of protocol 160 may be used during construction of disk drive 10 to align a magnetic orientation of the disk drive head component that becomes misaligned, for example, because of ESD. Additionally, protocol 160 may be used to realign the disk drive head component after extensive read and write operations of disk drive 10 as described hereinabove.

Figure 8:
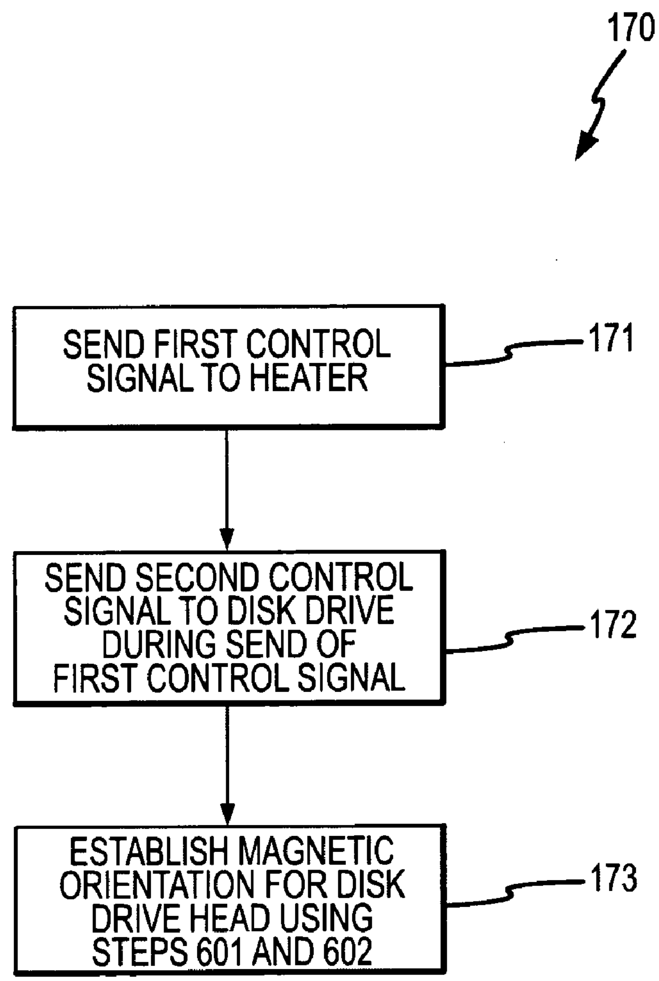
FIG. 8 is a flowchart of another protocol that may be associated with the disk drive head resetting system.

FIG. 8 is a flowchart of another protocol 170 that may be associated with the disk drive head resetting system 100 of FIG. 6A. In this embodiment, protocol 170 includes a step 171 of sending a first control signal to heater 71 (e.g., via control line 74). For example, the first control signal may be used to heat disk drive head 44 past a blocking temperature of disk drive head 44 as described in step 163 of FIG. 7. Additionally, protocol 170 includes a step 172 of sending a second control signal to disk drive head 44 while the first control signal is being sent to heater 71. The combination of the first and second control signals may be collectively used to establish/realign a magnetic orientation for disk drive head 44 in step 173. For example, the heat (e.g., a temperature of at least about 20° C. in one embodiment, and within a range of about 20° C. to about 80° C. in another embodiment) generated by the first control signal may substantially free a magnetic orientation of the disk drive head component. The second control signal may therefore be used to align the magnetic orientation to a desired magnetic orientation as described hereinabove.

As with protocol 160 of FIG. 7, protocol 170 may also be used in a manufacturing process or after the various components of the disk drive have been enclosed. Additionally, protocols 160 and 170 may be implemented using hardware, software, firmware or various combinations thereof. For example, a controller, such as controller 90 may be programmed with software and/or firmware instructions to operate in accordance with the embodiments described herein. Those skilled in the art are readily familiar with hardware, software, firmware and their various combinations and that specific implementations thereof are often a matter of design choice.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive head resetting system, comprising:
- a slider comprising a head;
- a heater associated with said slider and electrically isolated from said head; and
- a controller communicatively coupled to said heater and to said head, wherein said controller is configured for transferring a first control signal to said heater and a second control signal to said head at the same time to establish a magnetic orientation of said head.

2. The disk drive head resetting system of claim 1, wherein said first control signal is used to generate heat past a blocking temperature of said head.

3. The disk drive head resetting system of claim 1, wherein said heater is a resistive heater.

4. The disk drive head resetting system of claim 1, wherein said heater is external to said head.

5. The disk drive head resetting system of claim 1, wherein said first control signal comprises direct current of at least about 25 milliamps and said second control signal comprises direct current of more than 0 milliamps and no more than about 6 milliamps.

6. The disk drive head resetting system of claim 1, wherein said first control signal comprises substantially direct current of about 40 milliamps.

7. The disk drive head resetting system of claim 1, wherein said first control signal is transferred to said heater for no more than about one minute.

8. The disk drive head resetting system of claim 1, wherein said second control signal comprises substantially direct current of no more than about 6 milliamps.

9. The disk drive head resetting system of claim 1, wherein said second control signal is transferred to said head for no more than about one minute.

10. A disk drive comprising a head positioner assembly that in turn comprises said slider, a load/unload ramp, and the disk drive head resetting system of claim 1, wherein said controller is configured to transfer said first and second control signals while said head positioner assembly remains parked on said load/unload ramp.

11. The disk drive head resetting system of claim 1, wherein said heater comprises means for adjusting a fly height of said head during disk drive operations and means for heating said head to a temperature that substantially frees a magnetic orientation of a head component after disk drive operations have been terminated.

12. The disk drive head resetting system of claim 11, wherein said head component is a pinned layer, wherein said second control signal is transferred to said head to establish said magnetic orientation of said pinned layer.

13. The disk drive head resetting system of claim 1, wherein said heater is a fly height adjust heater, wherein a fly height adjustment function may be provided by said heater during disk drive operations, and wherein a head resetting function may be provided by said heater when said slider is parked relative to a load/unload ramp.

14. The disk drive head resetting system of claim 13, wherein said first control signal comprises electric current having a magnitude that is greater than a magnitude of electric current used when said heater provides said fly height adjustment function.

15. The disk drive head resetting system of claim 14, wherein said magnitude of electric current of said first control signal is greater than said magnitude of electric current when said heater provides said fly height adjustment by at least about 50 percent.

16. The disk drive head resetting system of claim 1, wherein said first control signal comprises electric current having a magnitude that is substantially greater than a magnitude of electric current of said second control signal.

17. A method of making a disk drive assembly, said disk drive assembly comprising a slider that in turn comprises a disk drive head and a separate heater, said method comprising steps of:
- communicatively coupling a controller to said heater and to said disk drive head; and
- programming said controller to transfer a first control signal to said heater and a second control signal to said disk drive head at the same time, wherein said first control signal is used to heat said disk drive head past a blocking temperature of said disk drive head, and wherein said second control signal is used to establish a magnetic orientation of said head.

18. The method of claim 17, wherein said step of programming said controller to transfer said first control signal comprises programming said controller to transfer said first control signal to said heater for no more than about one minute.

19. The method of claim 17, further comprising a step of generating said first control signal to comprise substantially direct current of about 40 milliamps.

20. The method of claim 17, wherein said step of programming said controller to transfer said second control signal comprises programming said controller to transfer said second control signal to said disk drive head for no more than about one minute.

21. The method of claim 17, further comprising a step of generating said second control signal to comprise substantially direct current of no more than about 6 milliamps.

22. The method of claim 17, further comprising a step of generating said first control signal comprises substantially direct current of at least about 25 milliamps and a step of generating said second control signal to comprise substantially direct current of more than 0 milliamps and no more than about 6 milliamps.

23. The method of claim 17, further comprising a step of using said heat to substantially free a magnetic orientation of a disk drive head component.

24. The method of claim 17, wherein said first control signal comprises electric current having a magnitude that is substantially greater than a magnitude of electric current of said second control signal.

25. The method of claim 17, wherein said disk drive assembly further comprises a head positioner assembly, that in turn comprises said slider, wherein said method further comprising a step of parking said head positioner assembly on a load/unload ramp, wherein said first and second control signals are transferred with said head positioner assembly being parked on said load/unload ramp.

26. A disk drive head resetting system, comprising:

a slider;

a heater configured with said slider;

a disk drive head configured with said slider;

means for generating at least two control signals;

means for transferring a first of said at least two control signals to said heater;

means for transferring a second of said at least two control signals to said disk drive head at substantially a same time as said first control signal;

wherein said heater comprises means for using said first control signal to generate heat past a blocking temperature of said disk drive head; and wherein said disk drive head comprises means for using said second control signal to establish a magnetic orientation for said disk drive head.

27. The disk drive head resetting system of claim 26, wherein said means for transferring said first control signal comprises means for transferring said first control signal to said heater for no more than about one minute.

28. The disk drive head resetting system of claim 26, wherein said first control signal comprises substantially direct current of about 40 milliamps.

29. The disk drive head resetting system of claim 26, wherein said first control signal comprises substantially direct current of at least about 25 milliamps.

30. The disk drive head resetting system of claim 26, wherein said means for transferring said second control signal comprises means for transferring said second control signal to said disk drive head for no more than about one minute.

31. The disk drive head resetting system of claim 26, wherein said second control signal comprises substantially direct current of no more than about 6 milliamps.

32. The disk drive head resetting system of claim 26, wherein said first control signal comprises substantially direct current of at least about 25 milliamps and wherein said second control signal comprises substantially direct current of more than 0 milliamps and no more than about 6 milliamps.

33. The disk drive head resetting system of claim 26, wherein said heat is used to substantially free a magnetic orientation of a disk drive head component.

34. The disk drive head resetting system of claim 33, wherein said disk drive head component is a pinned layer of said disk drive head.

35. A disk drive comprising a head positioner assembly, a load/unload ramp, and the disk drive head resetting system of claim 26, wherein said disk drive head resetting system is operable while said head positioner assembly remains parked on said load/unload ramp.

36. The disk drive head resetting system of claim 26, wherein said heater is a fly height adjustment heater, wherein a fly height adjustment function is provided by said heater during disk drive operations, and wherein a head resetting function is provided by said heater when said slider is parked relative to a load/unload ramp.

37. The disk drive head resetting system of claim 36, wherein said first control signal comprises electric current having a magnitude that is greater than a magnitude of electric current used when said heater provides said fly height adjustment function.

38. The disk drive head resetting system of claim 37, wherein said magnitude of electric current of said first control signal is greater than said magnitude of electric current when said heater provides said fly height adjustment function by at least about 50 percent.

39. The disk drive head resetting system of claim 26, wherein said first control signal comprises electric current having a magnitude that is substantially greater than a magnitude of electric current of said second control signal.

40. A method for making a disk drive assembly, comprising steps of:

sending a first control signal to a heater;

sending a second control signal to a disk drive head during said step of sending a first control signal; and establishing a magnetic orientation for said disk drive head using both said steps of sending.

41. The method of claim 40, further comprising a step of programming a controller to send said first control signal to said heater for no more than about one minute.

42. The method of claim 40, wherein said first control signal comprises substantially direct current of about 40 milliamps.

43. The method of claim 40, further comprising a step of programming a controller to send said second control signal to said disk drive head for no more than about one minute.

44. The method of claim 40, wherein said second control signal comprises substantially direct current of about no more than 6 milliamps.

45. The method of claim 44, wherein said first control signal comprises substantially direct current of at least about 25 milliamps.

46. The method of claim 40, further comprising a step of using said first control signal to generate heat with said heater to substantially free a magnetic orientation of a disk drive head component.

* * * * *